US011880666B2

(12) United States Patent
Yang et al.

(10) Patent No.: US 11,880,666 B2
(45) Date of Patent: Jan. 23, 2024

(54) GENERATING CONVERSATION DESCRIPTIONS USING NEURAL NETWORKS

(71) Applicant: ASAPP, INC., New York, NY (US)

(72) Inventors: Kevin Yang, Cambridge, MA (US); Howard Chen, Jersey City, NJ (US); Tao Lei, Jersey City, NJ (US); Shawn Henry, Longmont, CO (US)

(73) Assignee: ASAPP, INC., New York, NY (US)

( * ) Notice: Subject to any disclaimer, the term of this patent is extended or adjusted under 35 U.S.C. 154(b) by 931 days.

(21) Appl. No.: 16/517,756

(22) Filed: Jul. 22, 2019

(65) Prior Publication Data
US 2020/0250265 A1    Aug. 6, 2020

Related U.S. Application Data

(60) Provisional application No. 62/800,099, filed on Feb. 1, 2019.

(51) Int. Cl.
*G06F 40/35* (2020.01)
*G06F 40/56* (2020.01)
(Continued)

(52) U.S. Cl.
CPC .............. *G06F 40/35* (2020.01); *G06F 40/56* (2020.01); *G06N 3/044* (2023.01); *G06N 3/08* (2013.01); *G06N 3/048* (2023.01)

(58) Field of Classification Search
None
See application file for complete search history.

(56) References Cited

U.S. PATENT DOCUMENTS 10,594,757 B1 * 3/2020 Shevchenko ........... G06F 40/30
10,769,223 B1 * 9/2020 Patel ..................... G06F 16/583
(Continued)

OTHER PUBLICATIONS

Phillip C.-Y. Sheu; Heather Yu; C. V. Ramamoorthy; Arvind K. Joshi; Lotfi A. Zadeh; Conversational Thread Extraction and Topic Detection in Text-Based Chat ; pp. 87-113; URL: https://ieeexplore.ieee.org/document/5559058?arnumber=5559058&source=IQplus (Year: 2010).*

(Continued)

*Primary Examiner* — Richa Sonifrank
(74) *Attorney, Agent, or Firm* — GTC Law Group PC & Affiliates

(57) ABSTRACT

A description of a conversation may be generated to allow a person to understand important aspects of the conversation without needing to review the conversation. The conversation description may be generated by identifying one or more events that occurred in the conversation and then generating the description using the identified events. A set of possible events may be determined in advance for a particular application. The events may be identified by using an event neural network for each event. Each event neural (Continued)

network may process the messages of the conversation to generate an event score that indicates a match between the conversation and the corresponding event. The event scores may then be used to select one or more events. Message scores from the event neural network of a selected event may then be used to select one or more messages of the conversation as a rationale for the selected event.

20 Claims, 9 Drawing Sheets

(51) Int. Cl.
    *G06N 3/08*    (2023.01)
    *G06N 3/044*    (2023.01)
    *G06N 3/048*    (2023.01)

(56) References Cited

U.S. PATENT DOCUMENTS

| | | | |
|---|---|---|---|
| 2018/0322115 A1* | 11/2018 | Shi | G06F 40/169 |
| 2018/0357551 A1* | 12/2018 | Kansky | G06T 7/75 |
| 2019/0102078 A1* | 4/2019 | Bhatt | G06F 3/0481 |
| 2019/0155905 A1* | 5/2019 | Bachrach | G06N 3/045 |
| 2019/0318003 A1* | 10/2019 | Kennedy | G06N 3/08 |
| 2020/0012919 A1* | 1/2020 | Bathaee | G06N 20/10 |
| 2020/0320988 A1* | 10/2020 | Rastogi | G10L 15/1815 |

OTHER PUBLICATIONS

Lei, et al., "Rationalizing Neural Predictions", EMNLP 2016: Conference on Empirical Methods in Natural Language Processing, Austin, Texas, USA, https://people.csail.mit.edu/taolei/papers/emnlp16_rationale.pdf (accessed May 30, 2019), Nov. 1-5, 2016, 11 pages.

See, et al., "Get To The Point: Summarization with Pointer-Generator Networks", Association of Computational Linguistics (ACL), https://nlp.stanford.edu/pubs/see2017get.pdf (accessed on May 30, 2019), 2017, 20 pages.

Vinyals, et al., "Pointer Networks", arXiv:1506.03134v2 [stat.ML], https://arxiv.org/pdf/1506.03134.pdf (accessed May 30, 2019), Jan. 2, 2017, 9 pages.

Zhang, et al., "Rationale-Augmented Convolutional Neural Networks for Text Classification", Proceedings of the 2016 Conference on Empirical Methods in Natural Language Processing, Austin, Texas, , https://www.aclweb.org/anthology/D16-1076 (accessed May 30, 2019), Nov. 1-5, 2016, pp. 795-804.

* cited by examiner

CSR: Good morning.

CSR: How can I help you today?

Customer: Hello

Customer: <u>My internet isn't working</u> —— 210

CSR: I can help you with that. What is your address?

Customer: Hold on, I need to answer the door

Customer: Ok, I'm back

Customer: I live in Springfield

CSR: Please tell me your street address as well.

Customer: 101 Main St

CSR: <u>I see that we have a network outage that is affecting your location.</u> —— 220 We expect to have it resolved by 2 PM today.

CSR: We greatly apologize for the interruption in services. Is there anything else I can help you with today?

Customer: No, that's it.

CSR: Thank you for being a customer and have a good day.

Customer: You too. Bye.

Fig. 2

| Event ID | Actor | Action | Topic | Event Description Text |
|---|---|---|---|---|
| ev_1001 | Customer | Change | Address | Customer changed his/her address. |
| ev_1002 | Customer | Ordered | Internet | Customer subscribed to Internet plan. |
| ev_1003 | Customer | Upgrade | Internet | Customer upgraded Internet plan. |
| ev_1004 | Customer | Help | Internet | Customer requested assistance with Internet problem. |
| ev_1005 | CSR | Resolved | Internet | CSR resolved Internet problem. |
| ev_1006 | CSR | Refund | Internet | CSR granted customer a refund for Internet services. |
| ev_1007 | CSR | Inform | Outage | CSR informed customer of network outage. |
| ... | | | | |

Fig. 3

GENERATING CONVERSATION DESCRIPTIONS USING NEURAL NETWORKS

CLAIM OF PRIORITY

This patent application claims the benefit of U.S. Patent Application Ser. No. 62/800,099, filed Feb. 1, 2019, and entitled "GENERATING CONVERSATION DESCRIPTIONS USING NEURAL NETWORKS" (ASAP-0020-P01).

The content of the foregoing application is hereby incorporated by reference in its entirety for all purposes.

FIELD OF THE INVENTION

The present invention relates to automatically generating descriptions of conversations using neural networks.

BACKGROUND

Conversations between people may occur in a variety of circumstances, such as customer support sessions between a customer of a company and a customer service representative who is assisting the customer. It may be desired to create a summary or short description of the conversation to facilitate later actions relating to the conversation. For example, where the same customer later seeks support from the company and is being assisted by a second customer service representative, the second customer service representative may be able to better assist the customer by reviewing a description of the previous customer support session.

Presently known systems, including the generation of a conversation description manually, suffer from a number of drawbacks. For example, a manually generated conversation description may be time consuming, and the person providing the description may be rushed and/or may inadvertently leave out important details or otherwise provide a poorly written description. For example, a customer service representative could be required to provide a written description at the end of each customer support session, but since this requires more effort on the part of the customer service representative, it makes the customer support process more expensive for the company. Further, a customer service representative who is pressured to work quickly may not meet desired quality standards for describing customer support sessions.

Additionally, reliance upon a manual system may result in the customer support representative inadvertently missing a portion of the process (e.g., forgetting a field and/or step in the submission process), missing a portion of the subject matter of the conversation, and/or missing or mis-characterizing the subject matter of the conversation. Where the customer support representative is busy, a time lag between the end of the conversation and the entry of the conversation description may occur, making it more likely that a process or subject matter omission may occur.

BRIEF DESCRIPTION OF THE FIGURES

The invention and the following detailed description of certain embodiments thereof may be understood by reference to the following figures:

FIG. 2 is an example conversation.

FIG. 3 is an example list of events that may occur in conversations.

DETAILED DESCRIPTION

Conversations between people occur in a variety of circumstances where audio or text of the conversation is recorded. For example, the audio of an in-person conversation between two or more people may be recorded, and the conversation may later be transcribed, such as by using automatic speech recognition. Conversations may also occur over the phone, in a video conference, or as an exchange of text messages. A text message includes any message sent as text including but not limited to a message sent using email, SMS (short message service) or a special-purpose application (e.g., Facebook messenger, Apple iMessage, Google Hangouts, or WhatsApp). The techniques described herein may be used with any type of conversation but for clarity of presentation an example of a customer support session between a customer and a customer service representative (CSR) will be used as an example conversation.

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter.

In some instances, companies may provide automated support to customers. In these instances, the customer is part of a conversation where the messages received from the company are generated by a "bot" and are generated by mathematical models or algorithms. Accordingly, a conversation may include messages exchanged between people and computers or even between different computers (e.g., between two bots exchanging messages).

A customer may seek support from a company using a variety of communication techniques, and the techniques described herein are not limited to any particular communication techniques. For example, a customer may communicate by entering text messages or speaking, and the customer may send a message using any appropriate device, such as a computer, smart phone, tablet, wearable device, or Internet of things device. The customer may transmit the message using any appropriate techniques, such as using an app running on customer device (e.g., an app of the company or a third-party app created for processing customer requests), a web page, a text messaging client, or sending an email.

Figure 1:
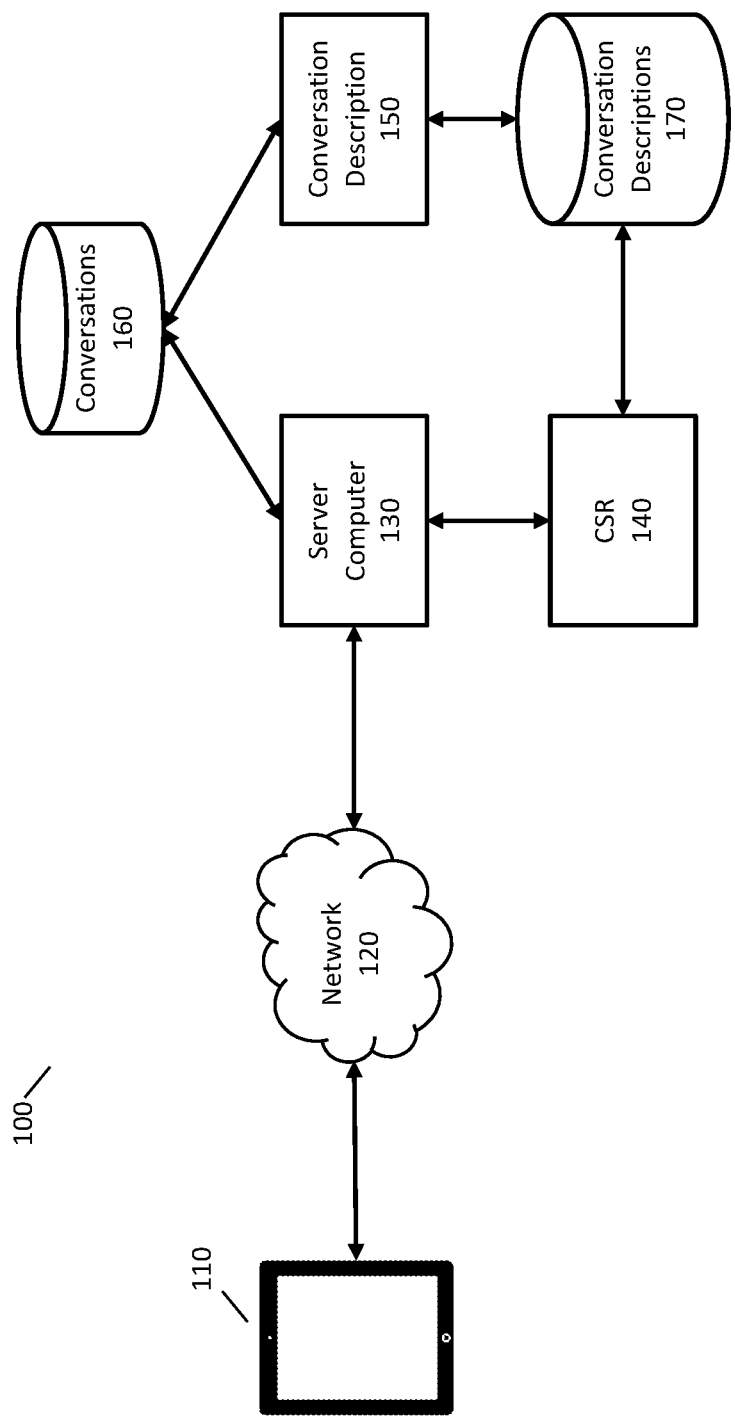
FIG. 1 is an example system for generating a description of a conversation using a neural network.

FIG. 1 is an example system 100 where users may participate in conversations and descriptions of the conversation may be generated and presented to a user. The example of FIG. 1 relates to customer support conversations between a customer and a customer service representative. In system 100, a customer may use customer device 110 to transmit a message seeking customer support from a company. Customer device 110 may be any device that allows a customer to transmit a message, such as a mobile device (e.g., a smart phone), and the message may be entered and transmitted using any appropriate techniques. The messages may be transmitted as text or one or more audio signals of speech that may later be processed with automatic speech recognition techniques.

The message may be transmitted to the company using network 120. Network 120 may include any appropriate communications network, such as the Internet, a mobile device network, a wide area network, or a local area network.

The company may receive the message from the customer at server computer 130. Server computer 130 may implement any appropriate techniques for assisting the customer support process, such creating a network connection with customer device 110, performing load balancing across multiple server computers, and so forth.

Server computer 130 may assist in establishing a customer support session between the customer using customer device 110 and a customer service representative (CSR) using CSR device 140. The customer and CSR may exchange messages during the session, and the messages may be stored in a customer support log, such as conversations data store 160. In some implementations, server computer 130 may establish a customer support session between the customer and automated customer support, where the messages of the automated customer support are generated automatically using artificial intelligence and machine learning techniques.

Either during or after the conversation between the customer and CSR, a description of the conversation may be generated. Conversation description component 150 may process the messages of the conversation to generate the conversation description, such as by using any of the techniques described herein. The conversation description may then be stored, such as in conversation descriptions data store 170.

The conversation description may then be used by the same CSR or a different CSR. In some implementations, the conversation description may be presented to the CSR during the conversation, and the conversation description may be updated as the conversation proceeds. This may be particularly useful in longer conversations. In some implementations, the conversation description may presented to a CSR during a different conversation. For example, the same CSR or a different CSR may be assisting the same customer at a later time, and the conversation description may be presented to the CSR to allow the CSR to quickly understand what happened during the previous customer support session.

FIG. 2 is an example conversation between a customer and a CSR. In this conversation, the customer has problems with his Internet connection and seeking assistance. During the conversation, the CSR informs the customer that there is a service outage affecting the customer and that it should be resolved soon. Using the techniques described herein, this conversation may be described as "Customer requested assistance with Internet problem. CSR informed customer of network outage." This conversation description excludes pleasantries and details that are not important to the conversation (e.g., the customer needing to answer the door during the conversation).

A conversation may be represented as a sequence of messages, and a message may represent any appropriate portion of the conversation. For example, a message may be the content of a transmission (e.g., each time a user selects a "send" button), a sentence sent by a user, a portion of a sentence (e.g., a phrase or clause), or all communications sent by a user until receiving a response from another user (e.g., a turn in the conversation). The techniques described herein may process messages, and each message being processed may be any appropriate portion of a conversation.

A conversation description, such as the conversation description above, may be generating by identifying events that occurred during the conversation, and then generating a description of the conversation using the identified events. For example, each of the two sentences in the above description may correspond to an event that occurred in the conversation of FIG. 2.

A set of possible events may be defined for a particular application of generating conversation descriptions. The set of possible events may, for example, be defined by a person or generated automatically. Each event may be performed by a person participating in the conversation. Where the application of generating conversation descriptions relates to customer support, the company that is providing the customer support may define a set of possible events that are expected to occur during customer support sessions.

FIG. 3 illustrates a list of possible events that may be used for a customer support application. A list of possible events may include any appropriate information relating to the event. For example, each event may have an event ID, an actor or a type of person who performed the event (e.g., a customer, a CSR, or both), an action of the event (e.g., a verb that describes the event), a topic of the event (e.g., a noun that describes a subject matter of the event), and event description text that provides a concise description of the event and that may be used to generate a conversation description.

Events need not include an actor, action, or topic, but in some implementations, these fields may assist in generating the list of events. For example, a company may create a list of products and services provided by the company, and each product or service may be a possible topic. The company may also create a list of verbs relating to actions that may be performed with the products and services (e.g., subscribe, cancel, upgrade, return, etc.), and each verb may be a possible action. The company may then create a list of possible events by combining all of the possible actions with all of the possible topics. In some implementations, this list may then be pruned to remove events for particular combinations of actions and topics that don't make sense (e.g., a customer may cancel Internet service but can't return it).

To create a description of a conversation, the conversation may be processed to identify events that occurred during the conversation (e.g., any of the events of FIG. 3), and a conversation description may be generated using the events. In some implementations, each event may be associated with event description text (such as the description text of FIG. 3), and a conversation description may be generated by combining the event descriptions for each of the identified events.

Figures 4, 5:
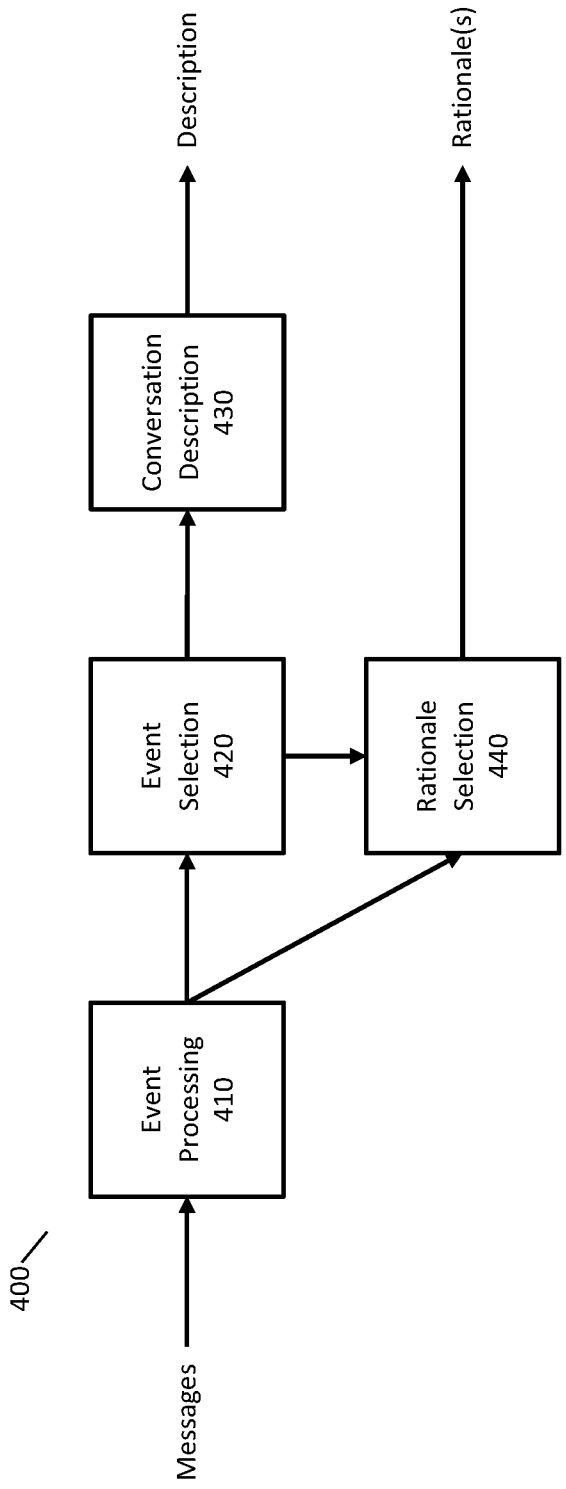
FIG. 4 is an example system for generating a description of a conversation and rationales for the description.
FIG. 5 is an example list of conversation descriptions.

FIG. 4 is an example system 400 for processing messages of a conversation to identify events to generate a description of the conversation using the identified events. In FIG. 4, the messages are also processed to determine a rationale for each event, where a rationale is a message that provides an explanation for identifying an event as being present in the conversation.

For the example of FIG. 2, two events are identified. The first event is ev_1004 ("Customer requested assistance with Internet problem."), and the second event is ev_1007 ("Agent informed customer of network outage."). The rationale for the first event may be message 210 from FIG. 2, and the rationale for the second event may be message 220 from FIG. 2. Techniques for determining the rationale for an event are described in greater detail below.

In FIG. 4, event processing component 410 may process the sequence of messages in a conversation and output an event score for each possible event that indicates whether the event occurred in the conversation. For example, the event score may be a likelihood or a probability. As described in greater detail below, event processing component 410 may include an event model (e.g., a mathematical model, such as a neural network) for each possible event. An event model for an event may be constructed to process the sequence of messages in a conversation and extract relevant information for determining if the event occurred in the conversation.

In some implementations, each message may include an indication of a person who sent the message (e.g., a name or an ID of the person) or an indication of the type of person who sent the message (e.g., a customer or a CSR). In some implementations, each message may be modified to start with text that indicates the sender or type of sender. For example, when a CSR sends a message "Good morning.", the message processed by event processing component 410 may be "CSR: Good morning." Including information about the sender of the message may improve the processing of the mathematical models or neural networks described in greater detail below.

Event selection component 420 may receive the event scores from event processing component 410 and select one or more events as occurring in the conversation. For example, event selection component 420 may select a number of events having highest scores or all events with scores above a threshold.

Conversation description component 430 may receive the selected one or more events and generate a text description of the conversation. In some implementations, each event may be associated with an existing event description text, and conversation description component 430 may combine (e.g., concatenate) the event description text for each event to generate the text description of the conversation.

In some implementations, an event may be associated with one or more variables or slots that may be used to provide additional information about an event. For example, a company may have an event relating to the purchase of a phone by the customer. Without a variable, the event description text may be "Customer purchased phone" and the event description text would not indicate which phone was purchased by the customer.

To provide additional information, this event may be associated with a variable for the model of the phone purchased by the customer. To include this information in the event description, the event description text may include a placeholder for the model of the phone purchased by the customer. For example, the event description text may be "Customer purchased phone {{ phone_model }}."

The model of the phone that the customer purchased may be obtained by processing the messages of the conversation. For example, named entity recognition techniques may be used to process the messages of the conversation to extract entity text corresponding to the model of the phone purchased by the customer. The variable in the event description text may then be replaced with the entity text to obtain event description text like "Customer purchased phone Galaxy S9."

In some instances, it may be possible that the named entity recognition is not able to extract model of the purchased phone (e.g., if it was typed as "GlxyS9"). In this instance, an alternative description text may be used that does not include the variable (e.g., "Customer purchased phone.") or the variable may be removed with inserting any text.

In FIG. 4, rationale selection component 440 may determine rationales for the selected one or more events. Rationale selection component 440 may receive information from event selection component 420 indicating which events were selected. Rationale selection component 440 may also receive information from event processing component to determine which messages of the conversation provide a rationale for the event. As described in greater detail below, for a first event selected by event selection component 420, rationale selection component 440 may receive message scores from a first event model corresponding to the first event, where each message score indicates a match between a corresponding message and the first event. Rationale selection component 440 may select one or more messages for each event as a rationale for the event. For example, rationale selection component 440 may select a number of messages having highest scores or all messages with scores above a threshold.

The results of the processing of FIG. 4 may then be stored for future use, such as storing the results in conversation descriptions data store 170. For example, when a CSR is a assisting a customer, conversation descriptions of previous customer support sessions with this customer may be presented to the CSR to facilitate the CSR's understanding of the customer's previous customer support requests.

FIG. 5 is an example list of conversation descriptions that includes a description of the conversation of FIG. 2. A list of conversation descriptions may include any appropriate information. For example, each conversation description may include an ID of the conversation that is being described (the conversations may be stored in a separate location, such as conversations data store 160), a list of events that were identified in the conversation, the text description of the conversation that was generated using the identified events, and a list of rationales for each identified event (an event may have more than one message as a rationale). In some implementations, the text description of the conversation may not be stored and may instead be generated as needed from the events identified in the conversation. In some implementations, the information in the list of FIG. 5 may be stored with the conversations (e.g., in the same table of a database), and in some implementations, the conversation descriptions may be stored in a separately from the conversations.

Figure 6:
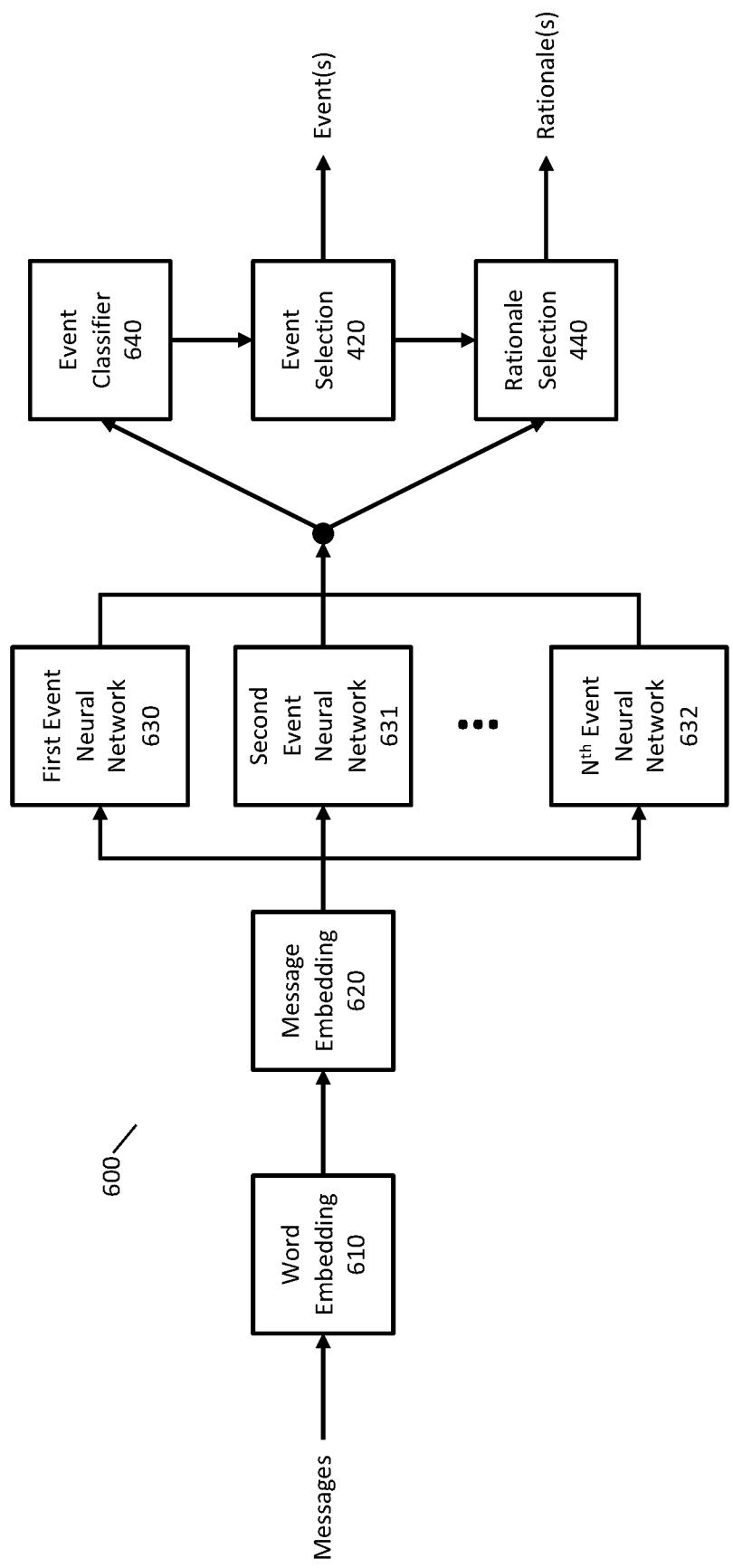
FIGS. 6 and 7 are example systems for identifying events that occurred in a conversation and rationales for the events.

FIG. 6 is an example system 600 for identifying events that occurred in a conversation and rationales for the events.

In FIG. 6, word embedding component 610 receives the messages of the conversation and obtains a word embedding for the words of the messages. A word embedding is a vector in an N-dimensional vector space that represents the word but does so in a manner that preserves useful information about the meaning of the word. For example, the word embeddings of words may be constructed so that words with similar meanings or categories are close to one another in the N-dimensional vector space. For example, the word embeddings for "cat" and "cats" may be close to each other because they have similar meanings, and the words "cat" and "dog" may be close to each other because they both relate to pets. Word embeddings may be trained in advance using a training corpus, and a lookup may later be performed to obtain a word embedding for each word of the conversation.

Any appropriate techniques may be used to compute word embeddings from a training corpus. For example, the words of the training corpus may be replaced with a vocabulary index where the vocabulary index indicates the position of the word in the vocabulary (e.g., that is sorted alphabetically). The word vocabulary indices may then be processed using any appropriate techniques, such as the techniques implemented in Word2Vec, GloVe, or fastText software. A word embedding may accordingly be created for each word in the training corpus.

Message embedding component 620, may receive the word embeddings of the messages of the conversation and compute a message embedding for each message of the conversation. A message embedding is a vector in an N-dimensional vector space that represents the message but does so in a manner that preserves useful information about the meaning of the message. For example, the message embeddings of messages may be constructed so that messages with similar meanings or categories are close to one another in the N-dimensional vector space. For example, the message embeddings for "Hello" and "Good morning" may be close to each other because they have similar meanings.

Any appropriate techniques may be used to compute message embeddings of the messages of the conversation. In some implementations, a message embedding may be computed by processing the word embeddings of the words of the message with a neural network. For example, the word embeddings may be processed sequentially by a recurrent neural network (e.g., a stacked, bidirectional, recurrent neural network), and the message embedding may be the final hidden state of the recurrent neural network (or a combination of the final hidden states in each direction for a bidirectional neural network).

In some implementations, message embedding may be computed that includes context of previous and/or subsequent messages in the conversation. A message embedding with context includes additional information about the meaning of message that is determined using previous and/or subsequent messages. For example, where two messages in sequence are "Would you like to purchase the Galaxy S9?" and "Yes, I would like to buy it.", the meaning of "it" in the second message depends on the previous message. The previous message thus provides context for the meaning of "it" in the second message.

An initial set of message embeddings for the messages of the conversation may be computed as described above. This initial set of message embeddings may be further processed by another neural network. For example, the message embeddings may be processed sequentially by a recurrent neural network (e.g., a stacked, bidirectional neural network), and a message embedding with context for the $i^{th}$ message may be the output of the $i^{th}$ iteration (or time step) of the recurrent neural network (or a combination of the output of the $i^{th}$ iteration in the forward direction and the $(M-i)^{th}$ iteration in the backward direction for a bidirectional neural network and M messages in the conversation).

The output of message embedding component 620 may be a sequence of message embeddings, and each message embedding may or may not include information about the context of the message with respect to other messages in the conversation.

The sequence of message embeddings may then be processed by a separate event neural network for each possible event. FIG. 6 includes, first event neural network component 630, second event neural network component 631, up to Nth event neural network component 632 that correspond to N possible events, such as the events of FIG. 3. Each event neural network may sequentially process the message embeddings and may be configured to extract information from the messages of conversation that is relevant to determining whether the corresponding event occurred in the conversation.

Any appropriate neural network may be used to implement an event neural network. In some implementations, an event neural network may be implemented with an attention mechanism. An event neural network with an attention mechanism may include attention weights that allow the output of the event neural network to weight each of the message embeddings according to the relevance of each message to the corresponding event. The attention weights may be referred to as message scores since each attention weight corresponds to a message. This is in contrast to a neural network without an attention mechanism, where the neural network may not weight each of the messages to determine an output. In some implementations, an event neural network may include a multi-layer perceptron and attention weights.

Denote the message embeddings of a conversation with M messages as $m_1, m_2, \ldots, m_m$ and the number of possible events as N. In some implementations, a $k^{th}$ event neural network (where k ranges from 1 to N) may perform the following processing:

$$e_{k,i} = u_k^T \tanh(W_k m_i + b_k)$$

$$a_{k,i} = \frac{\exp(e_{k,i})}{\sum_{j=1}^{M} \exp(e_{k,j})}$$

$$o_k = \sum_{i=1}^{M} a_{k,i} m_i$$

where $o_k$ is vector that is the output of the $k^{th}$ event neural network, the superscript T indicates transpose, and $u_k$, $W_k$, and $b_k$ are parameters of the $k^{th}$ event neural network. The output $o_k$ may be referred to as an event vector that represents the information in the conversation that is relevant for determining whether a $k^{th}$ event occurred in the conversation.

The event vector of each of the event neural networks may be processed by event classifier component 640 to compute an event score for each event that indicates a match between the messages of the conversation and the corresponding event. In some implementations, the event score may be a probability that the corresponding event occurred in the conversation. In some implementations, the event scores may be computed as follows:

$$s_k = \sigma(v^T o_k)$$

where σ is an activation function (such as a sigmoid function) and v is a vector of parameters.

Event selection component 420 may perform the same operations described above for FIG. 4, and it may select one or more events as occurring in the conversation using the event scores.

Rationale selection component 440 may perform the same operations described above for FIG. 4, and it may select one or more messages as rationales for each selected event. As above, rationale selection component 440 receives an indication of the selected one or more events from event selection component 420. Rationale selection component 440 may then obtain the message scores from the event neural network for each selected event. For example, where a first event is selected by event selection component 420, rationale selection component 440 may obtain the message scores from the first event neural network. Rationale selection component 440 may then select one or more messages from the conversation as rationales for the selection of the first event using the message scores as described above. This process may be repeated for the other selected events.

Accordingly, the output of the processing of FIG. 6 includes one or more events identified as being present in the conversation and one or more messages for each identified event as rationales for the events.

Figure 7:
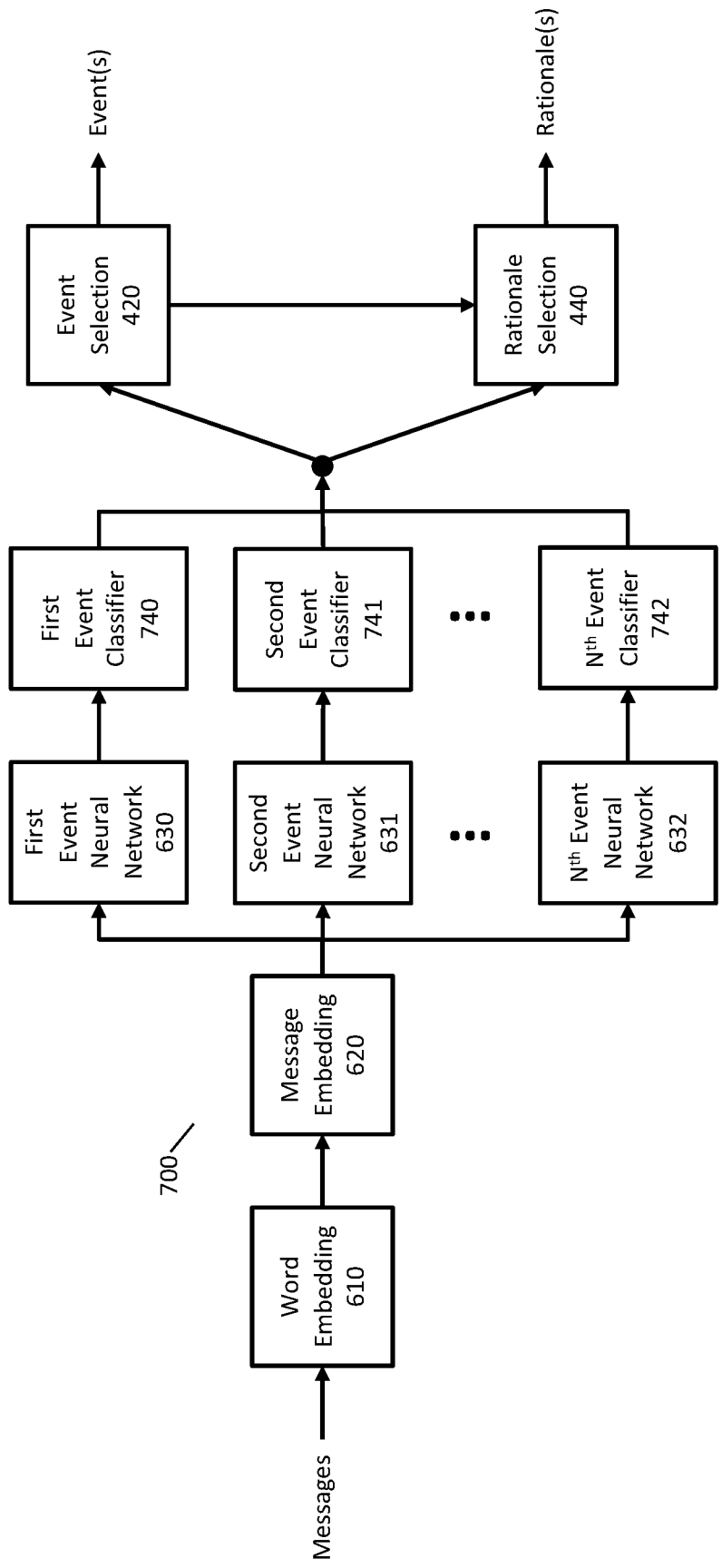

FIG. 7 is an example system 700 of another implementation for identifying events that occurred in a conversation and rationales for the events. In FIG. 7, event classifier component 640 has been replaced with first event classifier component 740, second event classifier component 741, up to N$^{th}$ event classifier component 742. The other components of FIG. 7 may be the same as the components of FIG. 6.

The event classifiers of FIG. 7 may be adapted to each of the possible events, and thus the parameters or processing of the event classifiers for different events may be different from one another. Each event classifier may process the output of a corresponding event neural network and output an event score. In some implementations, the event scores for a k$^{th}$ event classifier may be computed as follows:

$$s_k = \sigma(v_k^T o_k)$$

where $\sigma$ is an activation function (such as a sigmoid function) and $v_k$ is a vector of parameters for the k$^{th}$ event classifier.

As above, the output of the processing of FIG. 7 includes one or more events identified as being present in the conversation and one or more messages for each identified event as rationales for the events.

The parameters of the components of FIGS. 6 and 7 may be trained using a corpus of training data. The corpus of training data may include conversations, where each conversation has been labelled with one or more events that occurred in the conversation. Any appropriate conversations may be used (e.g., a log of existing customer support conversations), and any appropriate techniques may be used to label the conversations (e.g., manual labeling by trained reviewers).

Any appropriate techniques may be used to train the parameters using the training data. In some implementations, the parameters may be trained using a loss function that is a binary cross entropy for each class. For a given conversation from the training corpus, denote the event scores computed by the event classifier (or event classifiers) as $s_1, s_2, \ldots, s_N$ and denote the labels for the conversation as $q_1, q_2, \ldots, q_N$ (where a label is 1 if the corresponding event is present in the conversation and 0 otherwise). In some implementations, a loss function for the conversation may be computed as $$L = \frac{1}{N} \sum_{i=1}^{N} q_i \log(s_i) + (1 - q_i)\log(1 - s_i)$$

The loss function may then be minimized using stochastic gradient descent. In some implementations, each iteration of the training may be performed on a batch of conversations, and the loss function may be computed as the average of the loss for each conversation in the batch.

In some implementations, the event neural networks may be implemented using capsule neural networks. For a k$^{th}$ event neural network implemented using a capsule network, the following operations may be performed:

$$u_{k,i} = W_k m_i$$
$$c_k = \text{softmax}(b_k)$$
$$s_k = \sum_{i=1}^{M} b_k[i] u_{k,i}$$
$$o_k = \frac{\|s_k\|^2}{1 + \|s_k\|^2} \frac{s_k}{\|s_k\|}$$
$$b_k[i] = b_k[i] + o_k^T u_{k,i}$$

where $W_k$ is a matrix of parameters for the k$^{th}$ capsule neural network, each $b_k$ is initialized to a zero vector, and $b_k[i]$ indicates the i$^{th}$ element of $b_k$. The sequence of computing $c_k$, $s_k$, $o_k$, and $b_k$ may be repeated for several iterations (e.g., 2-5 iterations).

The vector $o_k$ is an output of the k$^{th}$ event neural network and may be referred to as an event vector. An event score that corresponds to a match between the messages of the conversation and the k$^{th}$ event may be computed as $$s_k = \|o_k\|$$

The elements of the vector $c_k$ are coupling strengths or coupling weights of the capsule neural network, and these may be referred to and used as message scores as described above.

The capsule neural networks may be trained using a separate margin loss for each capsule neural network:

$$L_k = q_k \max(0, \alpha^+ - \|o_k\|)^2 + \lambda \times (1 - q_k) \times \max(0, \|o_k\| - \alpha^-)^2$$

where $\alpha^+$ and $\alpha^-$ are margin values (e.g., 0.9 and 0.1), $\lambda$ is a training parameter to control the rate of convergence, and the $q_k$ are labels as described above. The total loss for training may be a combination of the losses for each capsule neural network, and the capsule neural networks may be trained using stochastic gradient descent.

Figure 8:
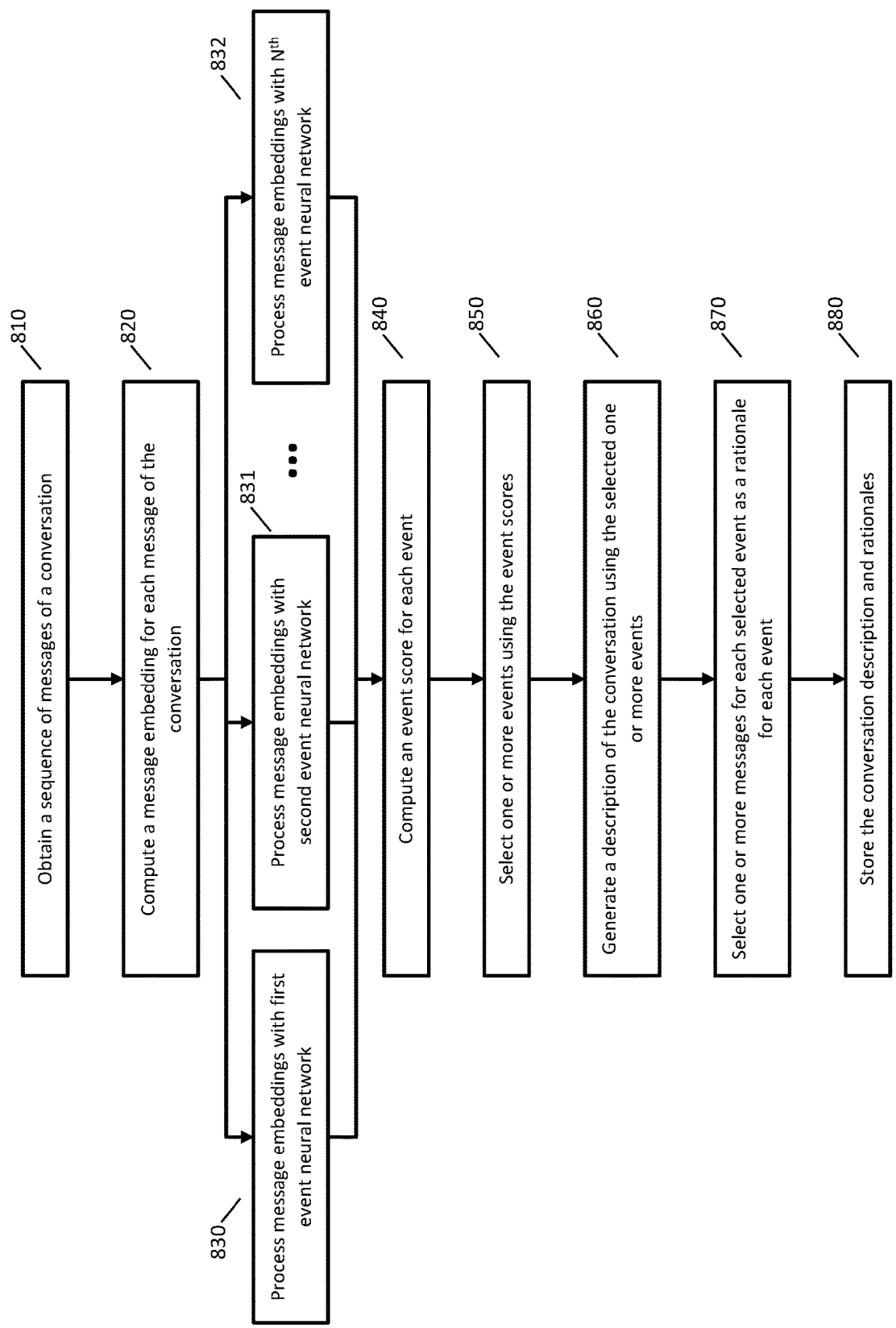
FIG. 8 is an example method for generating a description of a conversation and rationales for the description.

FIG. 8 is a flowchart of an example method for generating a description of a conversation and rationales for the description. In FIG. 8, the ordering of the steps is exemplary and other orders are possible, not all steps are required, steps may be combined (in whole or part) or sub-divided, and other steps may be added. The method described by FIG. 8 may be implemented, for example, by any of the computers or systems described herein.

At step 810, a sequence of messages of a conversation is obtained. The messages may be from any type of conversation, such as a customer support session, and may be obtained using any appropriate techniques.

At step 820, a message embedding is computed for each message of the conversation. Any appropriate techniques may be used to compute the message embeddings, and the message embeddings may or may not include context computed from previous or subsequent messages in the conversation. In some implementations, message embeddings may be computed using word embeddings obtained for the words of the conversation.

At steps 830, 831, and 832, the message embeddings are processed with an event neural network for each possible event that may occur in a conversation. Since the event neural networks are different and may be independent from one another, the processing of the event neural networks may be performed in parallel. For example, at step 830, the message embeddings may be processed by a first event neural network for a first event, at step 831, the message embeddings may be processed by a second event neural network for a second event, and so forth up to step 832 where the message embeddings may be processed by an $N^{th}$ event neural network for an $N^{th}$ event. Each event neural network may be implemented using any appropriate neural network, such as a neural network with attention or a multi-layer perceptron.

At step 840, an event score is computed for each event. In some implementations, an event score may be computed using an event classifier, and there may be one event classifier or an event classifier for each event. Any appropriate event classifier may be used, such as any of the event classifiers described herein.

At step 850, one or more events are selected as occurring in the conversation using the event scores. Any appropriate techniques may be used to select one or more events using the event scores, such as any of the techniques described herein.

At step 860, a description of the conversation is generated using the selected one or more events. Any appropriate techniques may be used to generate a description of the conversation using the one or more selected events, such as any of the techniques described herein.

At step 870, one or more messages are selected for each selected event as a rationale for selecting the event. For example, for a selected event, message scores may be obtained from the event neural network corresponding to the event, and the message scores may be used to select one or more messages as a rationale for the event. Any appropriate techniques may be used to select a rationale for an event using message scores from the event neural network of the event, such as any of the techniques described herein. In some implementations, step 870 may not be performed and messages may not be selected as rationales for events.

At step 880, the conversation description and/or rationales may be stored for later use. For example, the conversation description and/or rationales may be stored in a database alongside the conversations or may be stored in a different database. Any appropriate information about the conversation description and/or rationales may be stored, such as the text of the conversation description, identifiers of the events in the conversation (that may be used to later generate a text description of the conversation), the text of the rationales, or identifiers of messages to be used as rationales.

The conversation description may later be provided to a user to help the user understand the events that occurred in the conversation without the user needing to review the messages of the conversation. For example, the conversation description may be provided to a CSR who is assisting a customer to help the CSR quickly understand the events that occurred in a previous customer support session.

In some implementations, a rationale for an event of a conversation may be presented to a user. For example, the conversation description may be presented on a web page, and a link or a button may be available to allow the user to view the one or more messages that were the rationale for an event. The rationale may provide additional details relating to the event or help the user understand why the event was determined to be present in the conversation.

The processing of FIG. 8 may be performed any number of times. For example, the processing of FIG. 8 may be performed for each customer support session of a company. The processing of FIG. 8 may be performed at any appropriate time, such as during a conversation, at the end of a conversation, as part of batch processing (e.g., at the end of a day, week, or month), or on demand when the conversation summary is requested.

In some implementations, events may be split into two or more components, such as action of the event, or a topic of the event, such as the actions and topics indicated in FIG. 3. Instead of directly identifying an event in the conversation, an action and topic, may be identified, and the event may be determined from the identified action and topic.

In some implementations, the event neural networks may be replaced by two or more neural networks, such as an action neural network and a topic neural network. The action and topic neural networks may be implemented using the same techniques described above, and the output of these neural networks may be processed by an action classifier and a topic classifier to compute action scores and topic scores. One or more actions and topics may be selected using the same techniques described above for selecting events using event scores.

One or more events may be selected using the action scores and the event scores. In some implementations, statistics such as the probability of an action given a topic (P(action|topic)), a probability of a topic given an action (P(topic|action)), a probability of an action occurring in a conversation (P(action|conversation)), a probability of a topic occurring in a conversation (P(topic|conversation)), a rationale probability for an identified action (P(rationale|action, conversation)), or a rationale probability for an identified topic (P(rationale|topic, conversation)) may also be used to select one or more events. These statistics may be computed from an existing corpus of conversations using techniques known to one of skill in the art or may be computed using the techniques described above.

In some implementations, a triple score may be computed for action-topic-rational triples using combinations (e.g., products) of two or more of the probabilities described above. For example, suppose that a conversation consists of 10 messages that may be used as rationales, that 3 actions exceed a threshold, and that 2 topics exceed a threshold. Triple scores may be computed for a total of 60 action-topic-rational triples (10 times 3 times 2), and one or more triples having highest triple scores may be selected to determine the events (from the actions and topics of the highest scoring triples) and the rationales for the events. In some implementations, triple scores may be computed for all possible combinations of actions, topics, and messages, and in some implementations, triple scores may computed for a subset of the actions and topics where the subsets are selected using the action scores and the topic scores.

Figure 9:
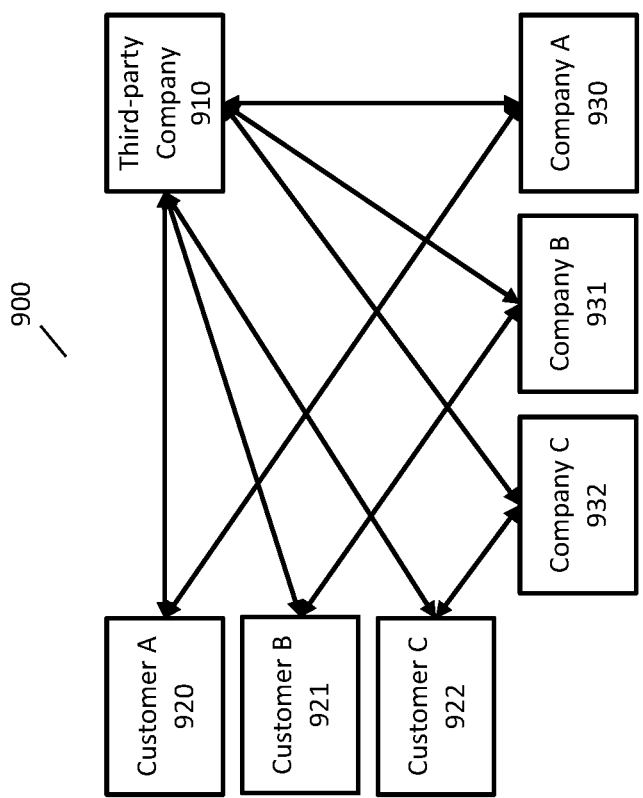
FIG. 9 is an example system for a third-party company to provide services to other companies.

In some implementations, a third-party company may provide services to other companies relating to any of the techniques described herein. For example, a company may provide a messaging application for use by its customers, and the company may use services of the third-party company to process messages of conversations to generate a description of the conversation and/or rationales for events that occurred in the conversation. A company may find it more cost effective to use the services of the third-party company than to implement its own services. FIG. 9 illustrates an example architecture that may be used by a company to obtain assistance from a third-party company in communicating with its customers.

FIG. 9 illustrates a system 900 that allows third-party company 910 to provide services to multiple companies. In FIG. 9, third-party company 910 is providing services to company A 930, company B 931, and company C 932. Third-party company 910 may provide services to any number of companies.

Customers of each company may communicate with a company where the support process uses the services of third-party company 910. For example, customer A 920 may be seeking support from company A 930, customer B 921 may be seeking support from company B 931, and customer C 922 may be seeking support from company C 932. It may or may not be apparent to the customers whether services of third-party company 910 are being used.

Third-party company 910 may assist a company in a variety of ways. In some implementations, third-party company 910 may assist in connecting a customer with a customer service representative working on behalf of the company. For example, third-party company 910 may select a customer service representative, may provide a user interface to a customer to make it easier for a customer to request support, and may provide a user interface to a customer service representative to assist the customer service representative in responding to a request of a customer. A customer service representative may have any appropriate relationship with the company on behalf of which it is providing customer support. For example, a customer service representative may be an employee or contractor of a company and providing customer support to only customers of that company, or a customer service representative may be providing services to multiple companies and providing support to customers of the multiple companies at the same time.

The network communications between third-party company 910, customers, and companies may be architected in a variety of ways. In some implementations, all communications between a customer and a company may be via third-party company 910 and there may not be any direct connection between the customer and the company. In some implementations, third-party company 910 may communicate with the company but may not communicate directly with the customer. In some implementations, a customer may communicate directly with the company and also third-party company 910.

Where a customer is connected to both a company and third-party company 910, each of the two connections may be used for different kinds of requests. For example, where the customer is interacting with the company in a way that does not require the services of third-party company 910 (e.g., navigating a web site of the company), the customer may use the network connection with the company. Where the customer is interacting with the company in a way that uses the services of third-party company 910, the customer may use the network connection with third-party company. It may not be apparent to the customer whether the customer is using a network connection with the company or with third-party company 910.

Figure 10:
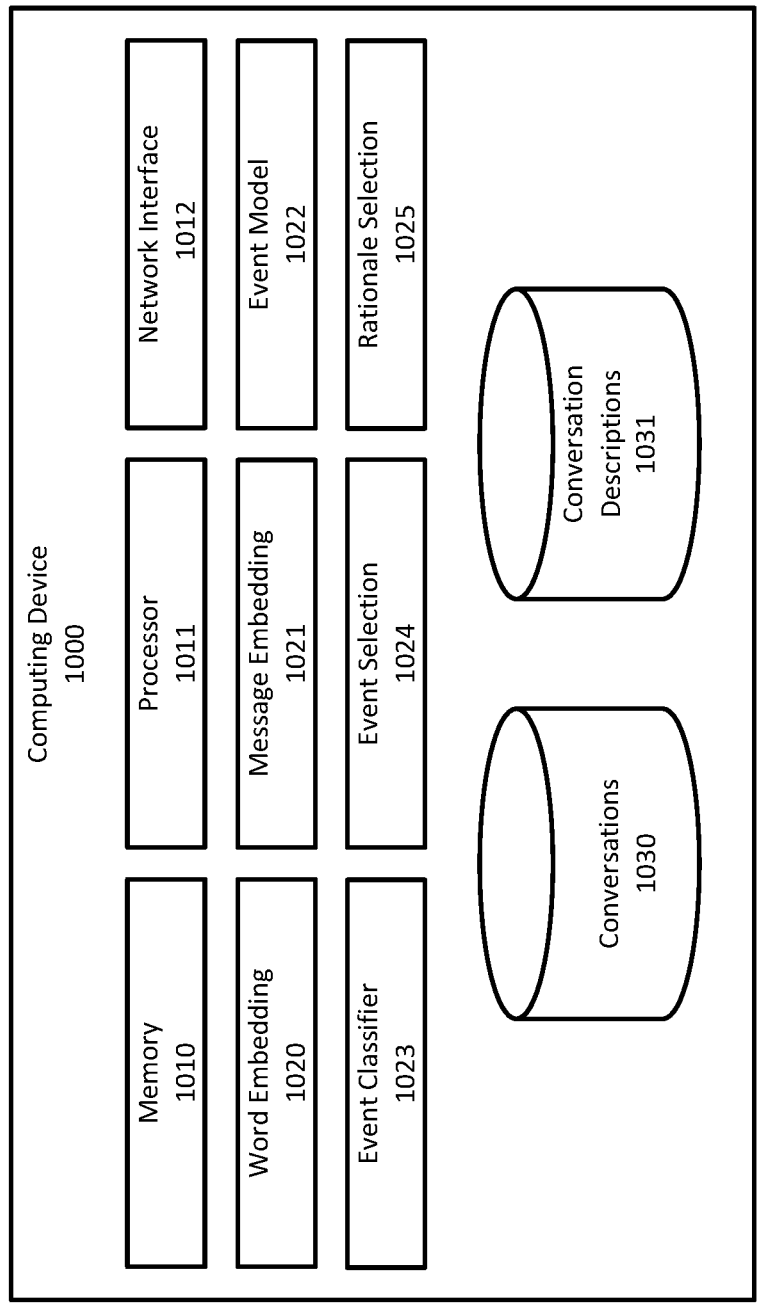
FIG. 10 is an exemplary computing device that may be used to generate a description of a conversation and rationales for the description.

FIG. 10 illustrates components of one implementation of a computing device 1000 for implementing any of the techniques described above. In FIG. 10, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1000 may include any components typical of a computing device, such as volatile or nonvolatile memory 1010, one or more processors 1011, and one or more network interfaces 1012. Computing device 1000 may also include any input and output components, such as displays, keyboards, and touch screens. Computing device 1000 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1000 may have a word embedding component 1020 that may compute word embeddings or obtain previously-computed word embeddings using any of the techniques described herein. Computing device 1000 may have message embedding component 1021 that may compute a message embedding by processing a message using any of the techniques described herein. Computing device 1000 may have an event model component 1022 that may process message embeddings with a mathematical model (such as a neural network) to determine if an event occurred in a conversation using any of the techniques described herein. Computing device 1000 may have an event classifier component 1023 that may compute event scores using the output of event model component 1022 using any of the techniques described herein. Computing device 1000 may have an event selection component 1024 that may select one or more events as occurring in a conversation using the event scores and using any of the techniques described herein. Computing device 1000 may have a rationale component 1025 that may select one or more messages as a rationale for an event using any of the techniques described herein.

Computing device 1000 may include or have access to various data stores. Data stores may use any known storage technology such as files, relational databases, non-relational databases, or any non-transitory computer-readable media. Computing device 1000 may have conversations data store 1030 that may be used to store messages of conversations. Computing device 1000 may have conversation descriptions data store 1031 that may store conversation descriptions and/or rationales generated from conversations.

It can be seen that the described systems and operations herein provide for an improved conversation support system, such as within a customer support context, that provide for timely and correct descriptions of communicative events such as conversations. A conversation description allows a person to understand the more important aspects of the conversation without having to review the entire conversation. Example systems and/or operations herein provide for the capability to describe a lengthy conversation with a few sentences that concisely represent the important aspects of the conversation. For example, pleasantries (e.g., "Good morning, how can I help you today.") and other less important details may be omitted. Example systems and operations herein provide for automatically generated high-quality descriptions of conversations that allow later actions relating to the conversations to be performed more accurately and with lower cost.

In certain embodiments, example systems and operations herein improve the quality and timeliness of providing communication descriptions, ensuring that all process requirements are met, and improving the accuracy of the communication descriptions. Example systems and operations herein improve the workflow and productivity of customer service representatives, or other direct communication participants, by ensuring that description requirements are provided in a complete and timely manner. Example systems and operations herein improve the workflow and productivity of managers of direct communication participants, allowing more timely access to communication descriptions, enhancing the accuracy of communication descriptions, reducing the amount of extraneous or repetitive information in communication descriptions, providing for standardized communication descriptions (e.g., allowing for improved bucketing, ease of review for off-nominal communications, and/or reducing the human or computing processing required to analyze a group of communication descriptions), enhancing the quality of audits and other process checks, and/or providing additional time to review more complex and/or off-nominal communication events by reducing the amount of time spent ensuring that normal process operations are completed correctly.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for generating a description of a conversation, the method comprising:
   obtaining a sequence of messages of the conversation;
   computing a sequence of message embeddings by processing the sequence of messages with a message embedding neural network, wherein a message embedding is a vector in a vector space that represents a meaning of a corresponding message;
   identifying one or more events from a plurality of possible events in the conversation by:
      obtaining a plurality of event neural networks, wherein each event neural network corresponds to a possible event,
      computing an event score for each possible event, wherein computing a first event score for a first possible event comprises processing the sequence of message embeddings with a first event neural network corresponding to the first possible event, and
      selecting the one or more events for the conversation using the event scores and using a probability for a rationale, wherein the probability of the rationale includes at least one of P(rationale|action, conversation) or P(rationale|topic, conversation);
   generating a text description of the conversation using the one or more identified events;
   obtaining first message scores from the first event neural network corresponding to a first identified event of the one or more identified events, wherein the first message scores indicate a match between the sequence of messages and the first identified event; and
   selecting, using the first message scores, one or more of the sequence of messages of the conversation as the rationale for the selection of the first identified event, wherein the selected one or more of the sequence of messages of the rationale provide an explanation of the selection of the first identified event.

2. The computer-implemented method of claim 1, comprising:
   providing the text description of the conversation to a user.

3. The computer-implemented method of claim 1, wherein computing the sequence of message embeddings comprises:
   obtaining word embeddings for words of the sequence of messages, wherein a word embedding is a vector in a vector space that represents a meaning of a corresponding word; and
   processing the word embeddings with the message embedding neural network.

4. The computer-implemented method of claim 1, wherein each message of the sequence of messages includes text indicating a type of a person who sent the message.

5. The computer-implemented method of claim 4, wherein the type of person comprises a customer or a customer service representative.

6. The computer-implemented method of claim 1, wherein each event neural network computes a message score for each message of the sequence of messages.

7. The computer-implemented method of claim 1, wherein computing the first event score for the first possible event comprises:
   computing action scores for a plurality of possible actions that may occur during conversations;
   computing topic scores for a plurality of possible topics of conversations; and
   computing the first event score using the action scores and the topic scores.

8. The computer-implemented method of claim 1, wherein each event neural network comprises a multi-layer perceptron.

9. A system for generating a description of a conversation, the system comprising:
   at least one server computer comprising at least one processor and at least one memory, the at least one server computer configured to:
      obtain a sequence of messages of the conversation;
      compute a sequence of message embeddings by processing the sequence of messages with a message embedding neural network, wherein a message embedding is a vector in a vector space that represents a meaning of a corresponding message;
      identify one or more events from a plurality of possible events in the conversation by:
         obtaining a plurality of event neural networks, wherein each event neural network corresponds to a possible event,
         computing an event score for each possible event, wherein computing a first event score for a first possible event comprises processing the sequence of message embeddings with a first event neural network corresponding to the first possible event, and
         selecting the one or more events for the conversation using the event scores and using a probability for a rationale, wherein the probability of the rationale includes at least one of P(rationale|action, conversation) or P(rationale|topic, conversation);
      generate a text description of the conversation using the one or more identified events;
      obtain first message scores from the first event neural network corresponding to a first identified event of the one or more identified events, wherein the first message scores indicate a match between the sequence of messages and the first identified event; and select, using the first message scores, one or more of the sequence of messages of the conversation as the rationale for the selection of the first identified event, wherein the selected one or more of the sequence of messages of the rationale provide an explanation of the selection of the first identified event.

10. The system of claim 9, wherein the at least one server computer is configured to provide the text description of the conversation to a user.

11. The system of claim 10, wherein:
the sequence of messages is between a customer of a company and a first customer service representative of the company; and
the user is a second customer service representative of the company.

12. The system of claim 9, wherein each event of the plurality of possible events is associated with event description text, and generating the text description of the conversation comprises combining the event description text for each event of the one or more identified events.

13. The system of claim 12, wherein first event description text of a first identified event comprises a slot, and the at least one server computer is configured to generate the text description of the conversation by replacing the slot with entity text from a first message of the conversation.

14. The system of claim 13, wherein the entity text is obtained by performing named entity recognition on the sequence of messages.

15. The system of claim 9, wherein the at least one server computer is configured to:
receive a request to view the rationale for the first identified event from a user; and
transmit the selected one or more of the sequence of messages to the user.

16. One or more non-transitory, computer-readable media comprising computer-executable instructions that, when executed, cause at least one processor to perform actions comprising:
obtaining messages of a conversation;
computing message embeddings by processing the messages with a message embedding neural network, wherein a message embedding is a vector in a vector space that represents a meaning of a corresponding message;
identifying one or more events, from a plurality of possible events in the conversation by:
obtaining a plurality of event neural networks, wherein each event neural network corresponds to a possible event,
computing an event score for each possible event, wherein computing a first event score for a first possible event comprises processing the message embeddings with a first event neural network corresponding to the first possible event, and
selecting the one or more events for the conversation using the event scores and using a probability for a rationale, wherein the probability of the rationale includes at least one of P(rationale|action, conversation) or P(rationale|topic, conversation);
generating a text description of the conversation using the one or more identified events;
obtaining first message scores from the event neural network corresponding to a first identified event, of the one or more identified events, wherein the first message scores indicate a match between the conversation and the first identified event; and
selecting, using the first message scores, one or more of the messages of the conversation as Rail the rationale for the selection of the first identified event, wherein the selected one or more of the messages of the rationale provide an explanation of the selection of the first identified event.

17. The one or more non-transitory, computer-readable media of claim 16, wherein the messages comprises one or more audio signals of speech, and text of the messages is obtained by performing automatic speech recognition on the one or more audio signals.

18. The one or more non-transitory, computer-readable media of claim 17, wherein the message embedding neural network comprises a recurrent neural network.

19. The computer-implemented method of claim 1, further comprising:
receiving a request to view the rationale for the first identified event from a user; and
transmitting the selected one or more one or more of the sequence of the messages to the user.

20. The one or more non-transitory, computer-readable media of claim 16, further comprising computer-executable instructions that, when executed, cause the at least one processor to perform actions comprising:
receiving a request to view the rationale for the first identified event from a user; and
transmitting the selected one or more of the messages to the user.

* * * * *

UNITED STATES PATENT AND TRADEMARK OFFICE
CERTIFICATE OF CORRECTION

| | | |
|---|---|---|
| PATENT NO. | : 11,880,666 B2 | Page 1 of 1 |
| APPLICATION NO. | : 16/517756 | |
| DATED | : January 23, 2024 | |
| INVENTOR(S) | : Yang et al. | |

It is certified that error appears in the above-identified patent and that said Letters Patent is hereby corrected as shown below:

In the Claims

In Column 22, Line 23, in Claim 16, after "as", delete "Rail"

In Column 22, Line 39, in Claim 19, delete "one or more one or more" and insert --one or more-- therefor Signed and Sealed this
Twenty-eighth Day of January, 2025

Coke Morgan Stewart
*Acting Director of the United States Patent and Trademark Office*